INVENTORS
LEONARD P. FRIEDER
WALTER S. FINKEN
BY
Ernest D. Given
ATTORNEY

July 1, 1947.　　　L. P. FRIEDER ET AL　　　2,423,308
NET
Filed June 8, 1945　　　2 Sheets-Sheet 2

INVENTORS
LEONARD P. FRIEDER
WALTER S. FINKEN
BY
Ernest D. Given
ATTORNEY

Patented July 1, 1947

2,423,308

UNITED STATES PATENT OFFICE 2,423,308

NET

Leonard P. Frieder, Rockville Centre, and Walter S. Finken, Brooklyn, N. Y., said Finken assignor to said Frieder Application June 8, 1945, Serial No. 598,332

4 Claims. (Cl. 28—78)

This invention relates to nets and a method of making the same, and has particular reference to improvements in heavy duty nets.

In carrying out the invention a net is made up of interlocking loops or rings with a border braid along the perimeter of the net. Each ring may be interlocked with four other rings like itself except the border rings, each of which is interlocked with three other rings and the border braid.

Provision is also made to maintain the border rings in substantially fixed positions with respect to the border braid.

The loops or rings are preferably made of hollow center cords telescopically spliced in such a way that each ring is joined or locked so that no mousing is needed to prevent the rings from parting or becoming displaced with respect to others. Furthermore, the border rings which are interlocked with each other may each also be attached to the border braid in two places.

The rings that are secured at spaced intervals to the border braid are thus secured with cord that is telescopically spliced alternately through the ring and the border braid.

Hollow, braided handles may be installed at spaced intervals along the border braid, which extends along the periphery of the net, in such a manner that each one of these rings is looped with the border braid and one of the rings of the net itself. Since the border rings are anchored with respect to the border braid, these handles are prevented from moving appreciably from their positions so that they do not become displaced or several of them collected at any one place along the border.

The invention may be understood from the following description in connection with the accompanying drawing of an illustrative embodiment in which.

Figure 1:
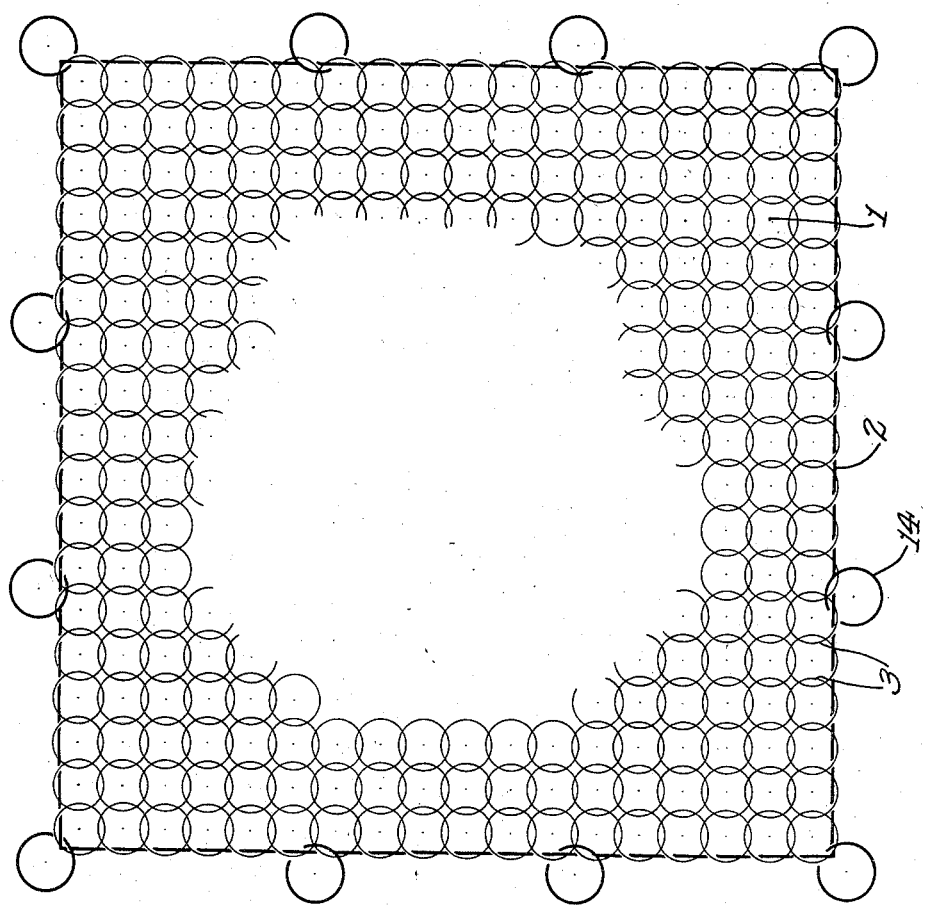
Fig. 1 is a diagrammatic plan view of a cargo net made according to the invention.
Figure 3:
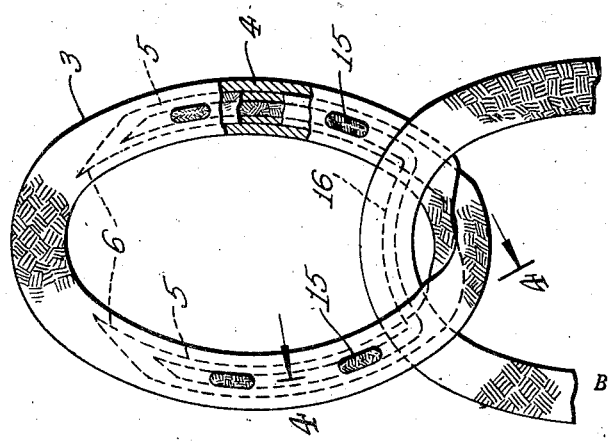
Fig. 3 illustrates a way in which the rings of the net may be connected to hold them in a desired relation.
Figure 4:
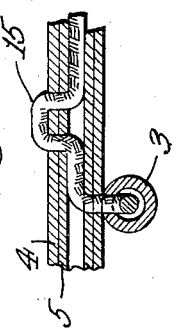
Fig. 4 is a section along the line 4—4 of Fig. 3.
Figure 2:
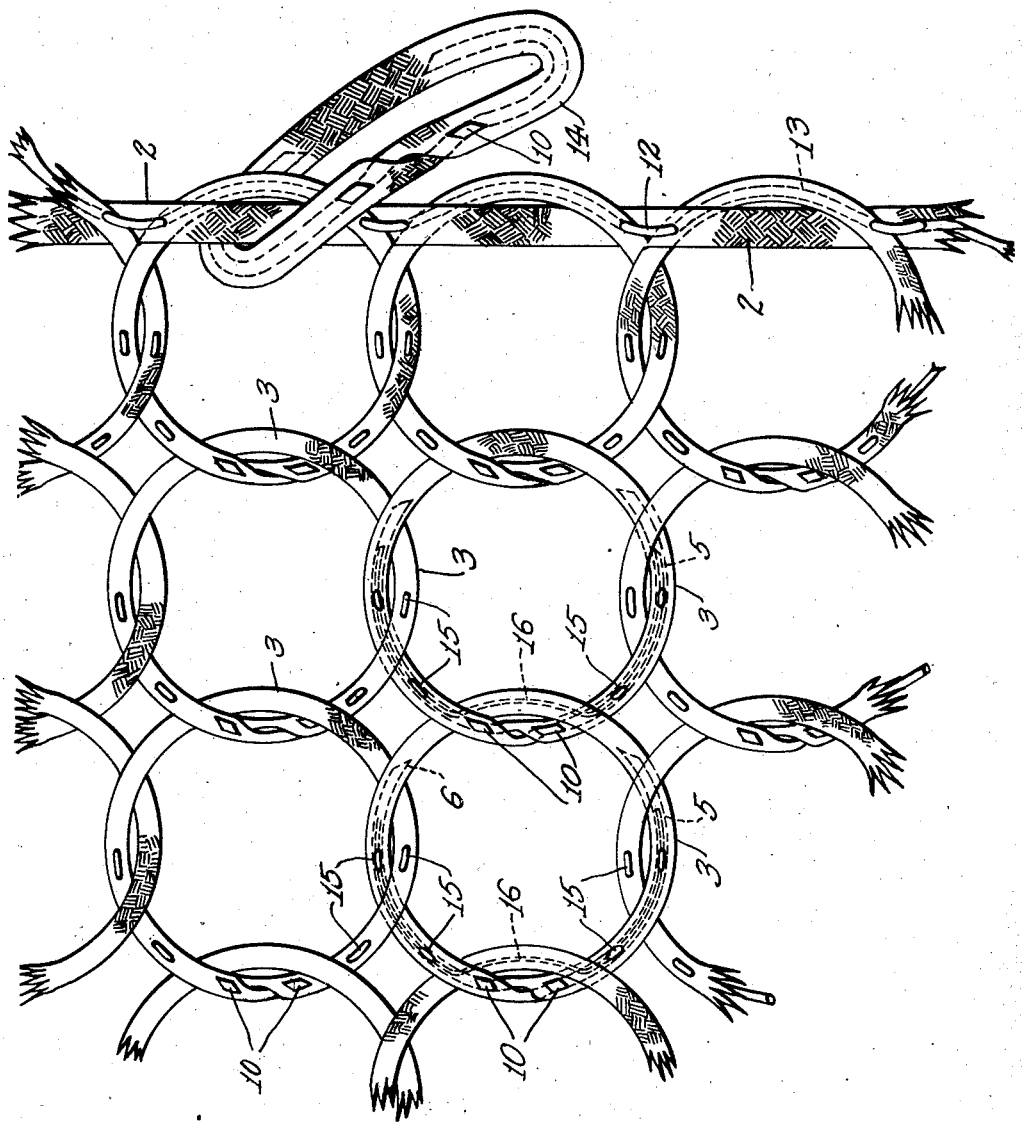
Fig. 2 is a similar view on a larger scale partly broken away.

In the drawings, reference character 1 indicates a net that comprises a border braid 2 which may, for example, be made of 5,000 pound test braided nylon having three picks per inch. Rings 3 forming the body of the net are made of cords which may, for example, be 3,000 pound test plaited or braided nylon having five picks per inch, and so woven as to form a hollow tube 4 (Fig. 3) with long tabs 5 formed at the ends thereof. These tabs have a width of about one-third to about one-fifth of the circumference of the hollow tube and they terminate in pointed ends 6 formed by elongating one or more picks at each end of each of the hollow tubes 4 and these elongated portions are each then introduced into the opposite ends of the tubes or braids and woven together. These elongated portions are threaded one or more times as shown at 10 between picks where they cross. Each one of these elongated portions extends inside the hollow center of the tube 4 a considerable distance which may be about a third of the circumference of each ring.

When tension is applied to the rings, either before or after they have been assembled to make a net, the picks are caused to clamp the threaded end portions 5 so tightly that rupture of the rings 3 will occur before these long tabs 5 can be pulled out.

A cord 12 which may, for example, be a nylon cord, is threaded through the border braids 2 and extended between the picks at intervals to the outside and back into the inside as shown at 13. The border braids are, preferably, of the hollow center cord type. These extending portions 13 of the cord 12 are passed through the braid 2 and between picks of the rings 3 that are located along the border of the net so these rings are anchored in position in a way that does not permit them to become displaced with respect to the border braid 2. Since each one of the other rings is interlocked with four others, the rings do not become displaced or permit large openings to appear in the net.

Hollow braided handles 14 encircle the border braid 2 and some of the rings 3. These handles are made in the form of rings made of hollow center cords in the way described above in connection with the rings but use heavier braid made of nylon. These rings may be about the same size as the rings 3.

The rings 3 may be further connected to hold them, or portions thereof, in any desired relation, by cords 15 each threaded through a portion of one ring as shown at 16 (Fig. 3) and the ends of the cords threaded in the tabs 5 and wall 4 of the adjacent ring 3.

While the invention has been explained in detail in connection with a cargo net, it is not limited to nets for cargo handling, as it may be employed, with suitable modifications and changes in making life nets, fender nets, drag nets, hatchway nets and torpedo nets, or nets for any other purpose where a net which is strong and simple in construction may be usefully employed.

What is claimed is:

1. In a net having a border, a net body within and held by said border composed of separate but interlaced rings, each of said rings consisting of a piece of cord with the oppositely extending ends of the piece interwoven with and extending lengthwise of the cord.

2. A net having a border of tubular material and tubular rings interlinked with each other and with said border and means to prevent said rings from becoming displaced along said border.

3. A net having a border of tubular material and tubular rings interlinked with each other and with said border and a cord extending through said border and said rings to prevent said rings from becoming displaced along said border.

4. The device of claim 1 in which said rings are each made of a hollow center cord having its ends threaded into the center of the cord.

LEONARD P. FRIEDER.
WALTER S. FINKEN.

REFERENCES CITED

The following references are of record in the file of this patent:

UNITED STATES PATENTS

| Number | Name | Date |
|---|---|---|
| 338,216 | Atwood | Mar. 16, 1886 |
| 1,703,622 | Hennessey, Jr. | Feb. 26, 1929 |
| 2,139,195 | Louttit | Dec. 6, 1938 |
| 1,585,749 | Whiting | May 25, 1926 |
| 1,464,720 | Mandalian | Aug. 14, 1923 |

FOREIGN PATENTS

| Number | Country | Date |
|---|---|---|
| 18,598 | France | Dec. 11, 1914 |